Patented Dec. 11, 1928.

1,694,588

UNITED STATES PATENT OFFICE.

DOZIER FINLEY, OF BERKELEY, AND WILLIAM LAUREN RHOADES, OF SAN FRANCISCO, CALIFORNIA, ASSIGNORS TO THE PARAFFINE COMPANIES, INC., OF SAN FRANCISCO, CALIFORNIA, A CORPORATION OF DELAWARE.

METHOD OF CURING CONCRETE.

No Drawing.   Application filed October 4, 1924.   Serial No. 741,759.

Our invention relates to a method of curing concrete and one of the objects of the invention is the provision of a method of supplying to the concrete the necessary quantity of water for its proper setting or curing.

Other objects of the invention together with the foregoing will be set forth in the following description of our preferred method for practicing the invention. It is to be understood that we do not limit ourselves to the showing made by the said description as we may adopt variations in our preferred method within the scope of our invention as set forth in the claims.

While it is obvious that our invention may be applied to the curing of concrete in substantially all of its uses, the present description will deal chiefly with the curing of concrete road-beds. In concrete work of this character present practice dictates a water content in the mix of about 8 per cent, that is to say, one thousand pounds of rock, sand and cement will be wet with about 80 pounds of water. This gives a mixture which can be readily handled, but the 8 per cent of water does not supply all of the water which will be needed in the chemical reactions which take place during the curing of the concrete. Authorities differ somewhat but probably about 13 per cent of water is actually taken up in the wetting, hardening and curing phases. It is however not easily possible to mix that much water with the dry ingredients in the first instance, and the problem becomes one of supplying the difference between the water requisite for a conveniently handled mix and the water ultimately required for the proper curing. Broadly this is one of the chief objects of our invention and we accomplish it by making the mix in the first instance with about 8 per cent water content and then after placing the concrete, we cover it to prevent the evaporation of the water from the exposed surface. In localities where there are frequent rains or where the general condition of the terrain is favorable, the required extra water will find its way into the concrete by natural means, but in other localities, such as arid sections where the required additional water cannot be thus supplied, we cover the freshly poured mix with a porous layer of material capable of holding sufficient water for the purpose, and then apply our covering over this water blanket to seal in the moisture.

In the laying of concrete structures it is necessary to supply to the mixture a sufficient amount of water for complete chemical combination with the Portland cement and it is good practice to provide for a small excess, to avoid drying out on the extreme surface until the concrete has thoroughly hardened. When concrete is cast in forms, it is usual to sprinkle water over the outside of the forms at intervals, for a sufficient length of time to insure these results. When concrete is laid as a side-walk or pavement it is frequently covered with earth or straw after it has obtained an initial set, and this covering is sprinkled from time to time during the hardening phase to insure that the required water is in close proximity to the concrete so that chemical reactions may be complete. Since the surface thus exposed to the atmosphere is relatively very large, the evaporation is correspondingly increased, and consequently the waste of water is great and in many localities a matter of serious moment.

It is also a common practice in the building of concrete highways, to flood the surface of the road slabs with water, retaining it on the surface of the slab by suitable earth dams. This too is wasteful, and especially so in the very regions where water is scarcest, as for example in the hot, arid regions of the west where surface evaporation from any standing water is very rapid.

Another serious objection to any method of curing which permits surface evaporation, is the lowering of temperature in the underlying structure. Concrete during the hardening phase is extremely responsive to temperature conditions. A rise of relatively few degrees hastens the hardening, and a cooling correspondingly delays the hardening. All authorities agree that cold retards the setting of concrete, even if it does not definitely cause deterioration. From a practical viewpoint the delay in hardening of a concrete road-bed may become a serious matter even tho the strength of the concrete may not be impaired.

The use of our covering is not only of tremendous advantage because it prevents loss of needed water by evaporation but because it brings about a higher temperature in the underlying structure and consequently shortens the time of curing. This is true not only because the cooling effect of evaporation is substantially avoided, but because radiation of absorbed heat is materially reduced, and also because the character of our covering is such as to facilitate and increase the absorption of heat from the sun. Experiments have shown that the temperature in the concrete slab itself close to the surface will be from ten to twelve degrees higher when our covering is used than when the surface of the concrete slab is flooded with water, other conditions being equal. Furthermore briquettes after being cured outdoors under water and under our paper covering, showed tensile strengths of 223 pounds and 245 pounds respectively after two weeks of curing, thus demonstrating a substantial increase in tensile strength in favor of our method.

While our invention is most obviously applicable to the curing of highway and sidewalk slabs, it has other uses and may be applied with entirely satisfactory results to the treating of mass concrete and the roof slabs of buildings.

In the practice of our invention we employ a dark heavy paper saturated and coated with a bituminous material such as asphalt, to give it added strength and to render it impervious. A light weight of prepared roofing may also be used. The black paper foundation together with the dark color of the saturating and coating material causes the paper to absorb heat and materially raise the temperature of the underlying structure as already explained. The asphalt saturant and coating, or other bituminous material used for that purpose, insures a high degree of waterproofness which effectually prevents evaporation from the underlying surfaces, and provides a sheet which will stand handling reasonably well.

After the concrete has been poured and leveled, and given the desired surface troweling, and has attained sufficient set to bear the weight of the covering without injury, the paper is rolled out over the surface of the concrete and secured in place by any convenient means such as by earth deposited along the edges of the sheet. When concrete is so treated there is a negligible loss of moisture therefrom. The concrete warms up in the day time and altho in the chill of night the moisture may condense on the underside of the sheet, it falls back onto the surface of the slab and is not lost. When the paper covering is used alone, it is presumed that the concrete will draw the required moisture from the ground or air. When the nature of the surroundings makes this means of supplying the required water to the concrete impossible, a saturated porous sheet or water blanket is used. This water blanket may consist of any medium capable of holding the water required in suspension and which is easy to apply and cheap. A light earth covering would be satisfactory in some cases, but we prefer to use a low-cost grade of porous felt which may be laid over the freshly poured concrete from conveniently sized rolls, then wet with water and the whole sealed under an overlying layer or coating of the impervious paper.

Both the impervious layer and the water blanket layer may be used many times so that the cost of curing concrete by our method amounts to about one cent per square yard at the present cost of material and labor.

Relative to the amount of water necessary for the curing of concrete slabs, it may be said that while it is usually requisite for concrete to take up, either chemically or otherwise, some thirteen percent of moisture, or water, in passing from the rock-sand (or other aggregate)—cement stage to the fully cured stage we do not of necessity add, through the agency of the porous sheet, all of the water comprised in the difference between that used in the mixing of the concrete and the thirteen percent, more or less, ultimately appearing in the slab. It is found, for instance, that if eight percent of water is used in the mixing operation and the slab is poured in place on the road or other site, and then is covered with a large excess of water held in place by low dams in accord with the present prevailing practice, the additional amount of water taken up by the slab during the usual curing time of approximately two weeks will amount to about one percent; or a total of nine percent, more or less, will be in the slab. The remaining amount, or about four percent, is thereafter absorbed or adsorbed, or chemically combined into the slab and may be supposed to be abstracted from the air, or from the ground, or from absorbed rainfall and dew, over a period of many months. Therefore in the use of the porous sheet, even in arid regions, we do not find it advisable or necessary to add all of the excess water for the completion of the curing phase, but only such an amount as is needed for the first reactions and to make up for unavoidable losses. This may be measured by the amount requisite for the upper surface of the slab to remain wet or well moistened during the period it is under cover. It is obviously impossible to state this in exact percentages because the amount of mixing water and the amount subsequently taken up by any particular concrete is peculiar to that concrete itself.

We claim:

1. The method of curing concrete which comprises overlaying the surface with a moisture holding material and covering said material with an impervious layer.

2. The method of curing concrete which comprises overlaying the surface with a porous sheet containing water and covering said sheet with an impervious sheet.

3. The method of curing concrete which comprises overlaying the freshly poured mix with a sheet of watersoaked felt and covering said sheet with an impervious layer.

4. The method of making concrete which comprises making the mix with water only sufficient to form a properly working mixture, covering the freshly poured mix with a porous sheet holding sufficient water to complete the chemical reactions incident to hardening and substantially preventing evaporation of the water in said sheet.

5. The method of curing concrete which comprises temporarily overlaying the surface of the uncured concrete with a waterproof sheet, and sealing the edges of the sheet to prevent the escape of moisture.

In testimony whereof, we have hereunto set our hands.

DOZIER FINLEY.
WILLIAM LAUREN RHOADES.